(12) United States Patent  
Ishikawa

(10) Patent No.: US 7,642,495 B2  
(45) Date of Patent: Jan. 5, 2010

(54) LIGHT SOURCE ERROR DETECTION APPARATUS AND METHOD

(75) Inventor: Tomohisa Ishikawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/109,972

(22) Filed: Apr. 25, 2008

(65) Prior Publication Data

US 2008/0265132 A1 Oct. 30, 2008

(30) Foreign Application Priority Data

Apr. 27, 2007 (JP) ............... 2007-119363

(51) Int. Cl.
- G01J 1/32 (2006.01)
- G01J 1/44 (2006.01)
- F21V 1/00 (2006.01)
- H01L 27/15 (2006.01)

(52) U.S. Cl. .................. 250/205; 250/214 R; 362/240; 257/82

(58) Field of Classification Search ................ 250/205, 250/226, 239, 552, 553, 214 R, 214 D, 208.4; 362/240, 800; 257/80–82, 88–89; 398/15; 372/31

See application file for complete search history.

(56) References Cited

U.S. PATENT DOCUMENTS 5,986,799 A 11/1999 Itou et al.
6,975,813 B1 12/2005 Inoue et al.
6,998,594 B2 * 2/2006 Gaines et al. ............... 250/205

FOREIGN PATENT DOCUMENTS

| JP | 11-112435   | 4/1999 |
| -- | ----------- | ------ |
| JP | 2000-89178  | 3/2000 |
| JP | 2000-244053 | 9/2000 |
| JP | 2002-135207 | 5/2002 |
| JP | 2005-85871  | 3/2005 |
| JP | 2007-132763 | 5/2007 |

OTHER PUBLICATIONS

Japanese Patent Application No. 11-112435 corresponds to U.S. Patent No. 5,986,799.
Japanese Patent Application No. 2000-244053 corresponds to U.S. Patent No. 6,975,813.
Japanese Office Action dated Jul. 14, 2009 and issued in corresponding Japanese Patent Application 2007-119363.

* cited by examiner

*Primary Examiner*—Georgia Y Epps
*Assistant Examiner*—Don Williams
(74) *Attorney, Agent, or Firm*—Staas & Halsey LLP

(57) ABSTRACT

A light source error detection system and method including monitoring a plurality of characteristics of a light source and controlling the light source based on a plurality of monitored results. The system and method control the light source differently for a first case when only one of the monitored characteristics is abnormal than a second case when more than two of the monitored characteristics are abnormal. In controlling the light source, an output power of the light source is decreased with different time constant for the first case and the second case.

13 Claims, 10 Drawing Sheets

LIGHT SOURCE ERROR DETECTION APPARATUS AND METHOD

CROSS-REFERENCE TO RELATED APPLICATIONS

The present application is related to and claims the benefit of foreign priority to Japanese application 2007-119363, filed on Apr. 27, 2007 in the Japan Patent Office, which is incorporated herein by reference in its entirety.

BACKGROUND

1. Field

The present invention is directed to light source anomaly state detection and, more particularly, to a light source anomaly state detection enabled to selectively control a light source based on monitored characteristics of the light source.

2. Description of the Related Art

A Wavelength Division Multiplexing (WDM) optical transmission is an example of one technique used in optical transmission systems. FIG. 9 is a block diagram showing a light source configuration for use with the WDM technique. As shown in FIG. 9, a light source 1 monitors an output optical power from a laser diode (LD) 4 using a monitoring photodiode (PD) 2 and an LD output light monitor 3, and monitors a wavelength of the output light from the LD 4 using a wavelength locker 5 and a wavelength monitor 6. When an anomaly is detected in a monitored value for the output optical power or in a monitored value for the wavelength is detected by an optical output alarm detector 7 or a wavelength alarm detector 8, the optical output is instantaneously blocked (shut down) by an optical power controller 9.

Generally, in a WDM optical transmission system, optical amplifiers which make use of EDFs (Erbium Doped Fibers) are disposed in the transmission lines to extend transmission distances. The WDM light, which is a wavelength multiplexed light composed of a plurality of signal lights with a plurality of differing wavelengths, is input to the optical amplifiers and amplified therein. When a change in the number of input wavelengths, i.e. the number of multiplexed optical signals included in the input WDM light, or some other factor causes an increase in input optical power, the amount of excitation light input to the EDF increases in Automatic Gain Control (AGC). Similarly, when a change in the number of input wavelengths or the like causes a reduction in input optical power, the amount of excitation light is reduced. Hence an amount of output optical power is controlled so as to remain constant.

FIG. 10 is a set of schematic plots illustrating optical changes in the transmission path when output from a portion of the light sources is instantaneously shut down. As shown in FIG. 10, when an anomaly in the monitored value of the output optical power is detected in a light source outputting a light of a specific wavelength, an output optical power 11 of the LD module of the light source in which the anomaly has been detected is shut down. As a result, the input optical power 12 to the EDF optical amplifier drops steeply by precisely the amount of output optical power of the shut-down light source.

Since there is a transition time (EDF excitation light emission time constant), which is a time between a time when the excitation light input to the optical amplifier and a time when emission occurs at the EDF, even though control is performed to reduce the excitation light intensity corresponding to a decrease of the input light power to the optical amplifier, there is a time when the optical amplifier remains in an excitation state corresponding to the intensity before the input optical power is reduced. This excitation state is a state having a high gain with respect to the reduced input optical power, and so an output optical power 13 from the optical amplifier temporarily increases. Thereafter, for the period (AGC circuit tracking time constant) until the automatic gain control (AGC) begins to function normally, the output optical power 13 of the optical amplifier becomes unstable, and the output optical power 14, which is the output optical power of the optical amplifier excluding the optical power of the shut-down light source, temporarily changes.

In WDM optical transmission systems, it is required that an anomaly occurring in a light source of a specific wavelength does not affect signal light of other wavelengths. Thus, even when optical output of the light source of the specific wavelength is shut down, the output optical power of the optical amplifier at other wavelengths must be maintained without any large changes.

A configuration in which an optical attenuator and an optical input monitor are provided at an optical input stage of the EDF optical amplifier is discussed in Japanese Patent Laid-Open No. H11-112435 (JP11-112435), for example. The optical attenuator allows variation based on an amount of change in the input optical power to the EDF optical amplifier. With this configuration, abrupt changes in the input optical power are absorbed by the optical attenuator, and temporary changes in the optical output power of the EDF optical amplifier are suppressed.

In the above-described and other similar configurations, such as the light source shown in FIG. 9, when an anomaly is detected in the monitored value, even if the cause is an anomaly in the various monitors and the optical output of the LD is in a controllable state, the optical output is uniformly shut down and a large level change temporarily occurs in the EDF optical amplifier in spite of the LD optical output being in a controllable state.

Further, in the above-described related art, such as the optical amplifier with the configuration disclosed in JP11-112435, it is necessary to provide the optical attenuator and the optical input monitor at an optical input stage of the optical amplifier. That causes an increase of a number of parts, requires a more complex configuration, and deterioration of noise properties.

SUMMARY

A light source monitored by a monitoring unit for a plurality of characteristics of the light source and controlled by a control unit based on a plurality of monitored results by the monitoring unit. The control unit controls the light source differently for a first case when only one of characteristics monitored is abnormal than for a second case when more than two of the characteristics monitored is abnormal.

Additional aspects and/or advantages will be set forth in part in the description which follows and, in part, will be apparent from the description, or may be learned by practice of the invention.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
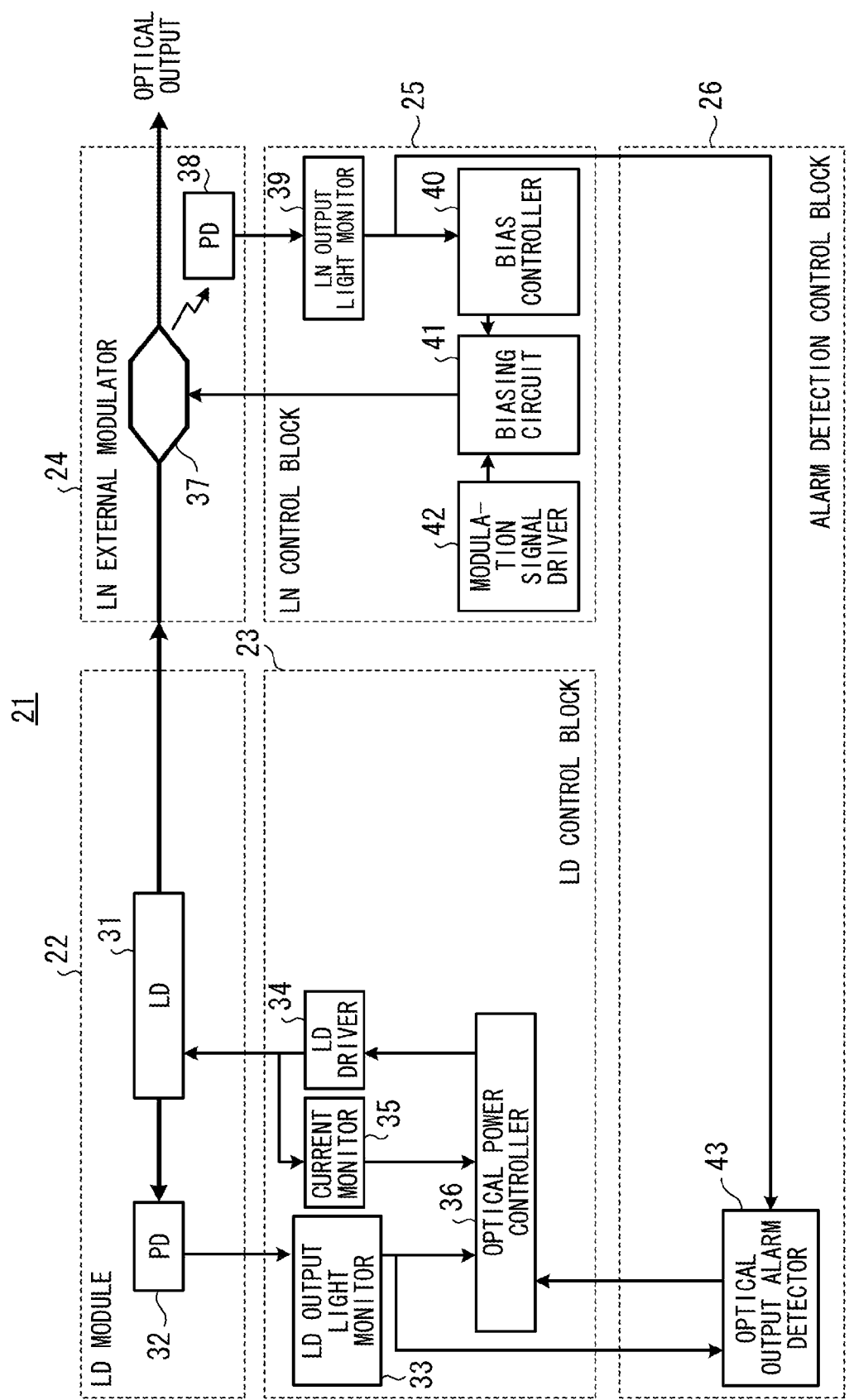
FIG. 1 is a block diagram illustrating a configuration of a light source according to an embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a block diagram showing a configuration of a light source according to an embodiment of the present invention. As shown in FIG. 1, a light source 21 includes an LD module 22 outputting laser light, an LD control block 23 controlling operation(s) of the LD module 22, an LN modulator 24 which is an external modulator for modulating output light from the LD module 22, an LN control block 25 controlling operation (s) of the LN modulator 24, and an alarm detection control block 26 detecting an occurrence of an anomaly. A light source as referred to herein may include any device, system or apparatus serving as a source of and/or controlling light including but not limited to an optical apparatus or a similar device.

The LD module 22 includes an LD 31 and a monitoring PD 32. The LD 31 outputs main output light in a forward direction and outputs monitor-use output light in a backward direction. Here, the forward direction of the LD 31 refers to the side of the LD module 22 from which output light is outputted. PD 32 converts the monitor-use output light to a current signal. The current signals vary depending on the power of the monitor-use output light.

The LD control block 23 includes an LD output light monitor 33, an LD driver 34, a current monitor 35, and an optical power controller 36. The LD output light monitor 33 monitors a power of the monitor-use output light based on an output signal from the PD 32. Hence, the PD 32 and the LD output light monitor 33 may be considered as functioning as a first monitoring unit. The LD driver 34 outputs a driving signal for causing the LD 31 to operate. The output power of the LD 31 is controlled by the driving signal.

The current monitor 35 monitors an output current of the LD driver 34. The optical power controller 36 outputs a control signal based on an output signal of the LD output light monitor 33 and an output signal of a current monitor 35. The LD driver 34 outputs a driving signal for the LD 31 based on the control signal. In a normal steady-state operating state, automatic power control (APC) is performed by the PD 32, the LD output light monitor 33, the optical power controller 36 and the LD driver 34.

The LN modulator 24 includes a modulator 37 having, for example, a Mach-Zehnder configuration and a monitoring PD 38. In an embodiment, the modulator 37 is a phase modulator that modulates main output light from the LD 31. The PD 38 converts output light of the phase modulator 37 to a current signal. The current signal varies depending on the output optical power of the phase modulator 37.

The LN control block 25 includes a modulator output monitor (LN output light monitor) 39, a bias controller 40, a biasing circuit 41, and a modulation signal driver 42. The modulator output monitor 39 monitors an output optical power of the phase modulator 37 based on the output signal of the PD 38. Hence, the PD 38 and the modulator output monitor 39 may be considered as functioning as a second monitoring unit. The bias controller 40 outputs a control signal based on the output signal from the modulator output monitor 39.

The biasing circuit 41 applies a bias voltage to the phase modulator 37 based on the output signal from the bias controller 40. In a steady-state operating state, automatic biasing control (ABC) is performed by the PD 38, the modulator output monitor 39, the bias controller 40, and the biasing circuit 41. Further, the biasing circuit 41 controls a phase of the main output light from the LD 31 in the phase modulator 37, based on a modulation signal supplied from the modulation signal driver 42. The main output light is modulated by controlling the phase thereof.

The alarm detection control block 26 includes an optical output alarm detector 43. The optical output alarm detector 43 detects anomaly in the light source 21 based on an output signal of the LD output light monitor 33 and an output signal of the modulator output monitor 39. The optical output alarm detector 43 then judges or determines, based on content of the detected anomaly, whether to instantaneously attenuate the optical output of the LD 31 or gradually attenuate the optical output of the LD 31. Hence, the optical output alarm detector 43 functions as a detection unit. The optical output alarm detector 43 outputs a control signal to the optical power controller 36 based on a result of the judgment or determination.

The optical power controller 36 instantaneously attenuates the optical output of the LD 31 or gradually attenuates the optical output of the LD 31 based on the output signal from the optical output alarm detector 43. When the optical output of the LD 31 is to be gradually attenuated, the optical power controller 36 causes gradual attenuation of the optical output of the LD 31 using a time constant which is at least the sum of the EDF excitation emission time constant and the automatic gain control circuit tracking time constant.

Figure 2:
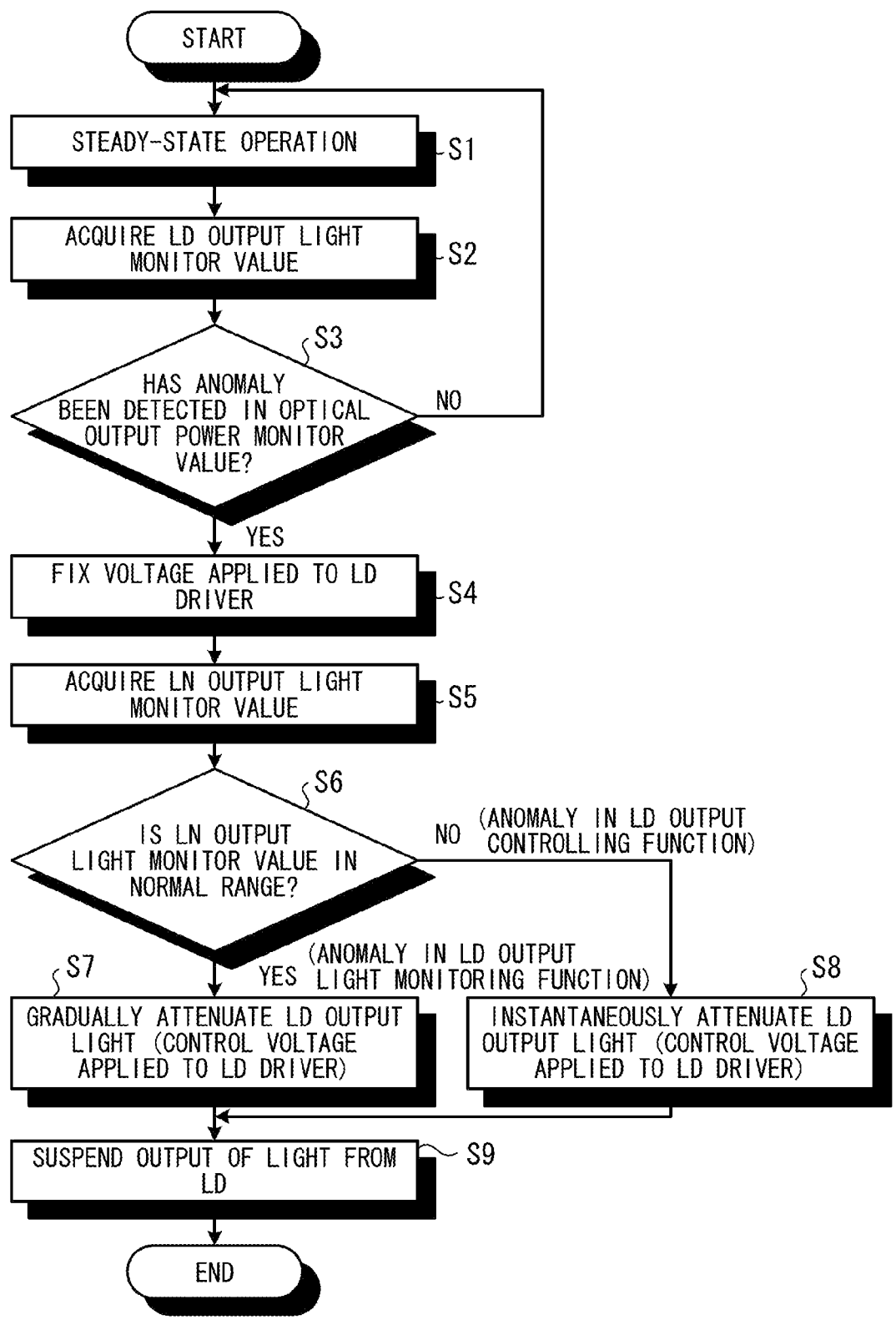
FIG. 2 is a flowchart illustrating an optical output suspending processing procedure used upon detection of an anomaly in a light source according to an embodiment.

FIG. 2 is a flow chart showing an optical output suspending processing procedure used upon detection of an anomaly in a light source according to an embodiment of the present invention. As shown in FIG. 2, in the normal steady-state operating state, the above-described automatic power control (APC) is performed, and the output optical power, for example, from the LD 31 is stable (operation S1). In this state, the optical output alarm detector 43 acquires a value from the LD output light monitor 33 (operation S2), and judges (determines)

whether an anomaly in the monitored value for the output optical power has been detected (operation S3). When no anomaly is detected in the monitored value for the output optical power (No in operation S3), the processing returns to operation S1.

When an anomaly in the monitored value for the output optical power is detected (Yes in operation S3), the optical output alarm detector 43 fixes a voltage applied to the LD driver 34 by the optical power controller 36 at a value immediately before detection of the anomaly (operation S4). As a result, the feedback control (APC) of the output optical power is suspended. Next, the optical output alarm detector 43 acquires and checks a value (LN output light monitor value) from the modulator output monitor 39 (operation S5). Next, the optical output alarm detector 43 judges whether the value from the modulator output monitor 39 is in a normal range (operation S6).

When the value is in the normal range (Yes in operation S6), the optical output alarm detector 43 judges that there is an anomaly in the function of the LD output light monitor. In this case, it is inferred that the LD 31 is in a state in which control by the optical power controller 36 and the LD driver 34 is possible. Hence, the optical output alarm detector 43 controls the voltage applied by the optical power controller 36 to the LD driver 34, so that the output light of LD 31 is gradually attenuated using the time constant which is at least the sum of the EDF excitation emission time constant and the automatic gain control circuit tracking time constant (operation 7). As a result, it is possible to suspend the output of light from LD 31 through gradual attenuation (operation S9).

When, on the other hand, the value of the modulator output monitor 39 is outside the normal range (No in operation S6), the optical output alarm detector 43 judges that the anomaly is in the LD output control function. In this case, it is inferred that the LD 31 is in a state in which control by the optical power controller 36 and the LD driver 34 is not possible. Hence, the optical output alarm detector 43 controls the voltage applied by the optical power controller 36 to the LD driver 34, so that the output light from the LD 31 is instantaneously attenuated. As a result, it is possible to suspend the output of light from the LD 31 instantaneously (operation S9).

Figure 3:
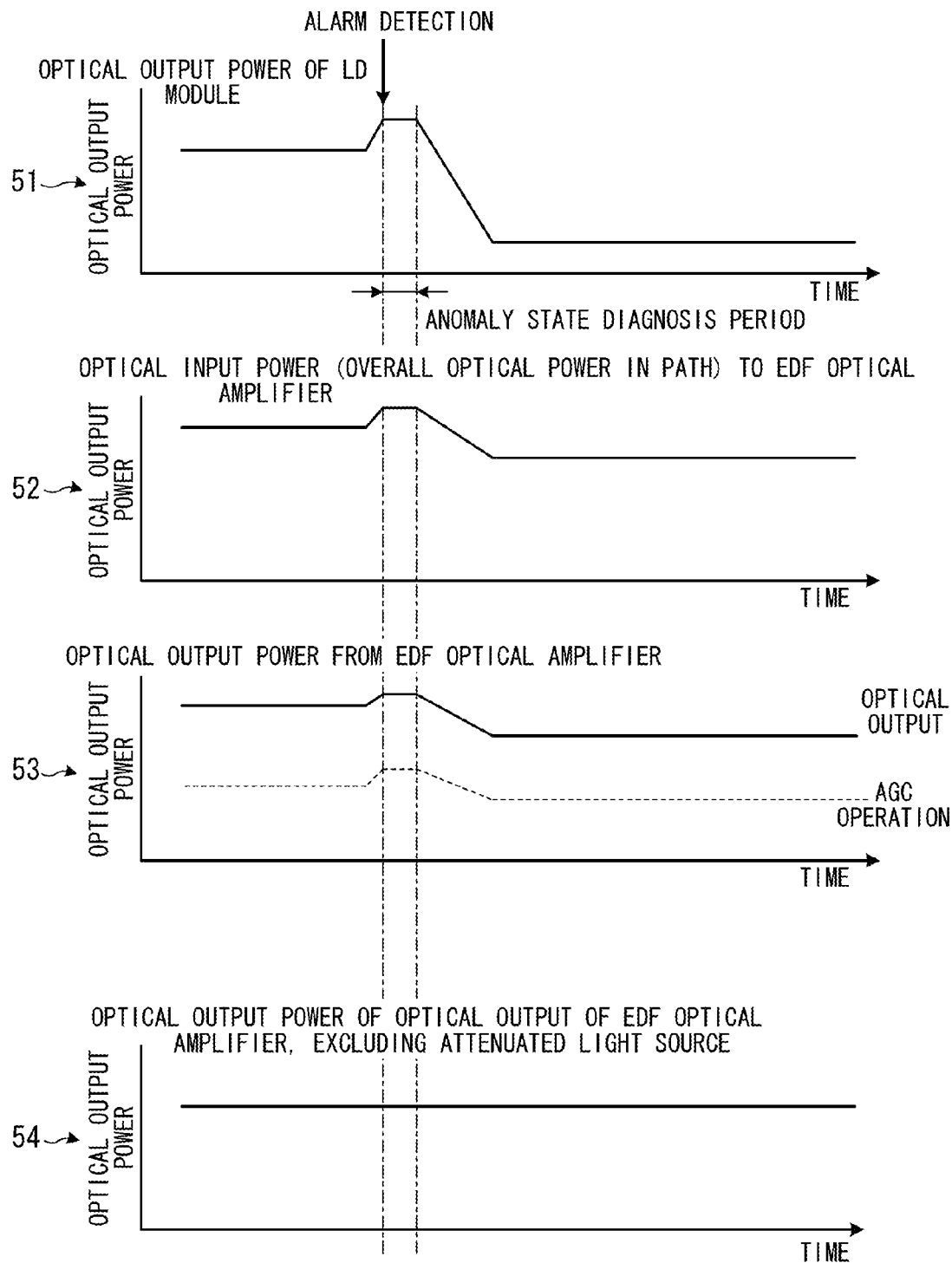
FIG. 3 is a set of schematic plots illustrating optical change(s) in a transmission path of a system using a light source according to an embodiment.

FIG. 3 is a set of schematic plots illustrating optical changes in a transmission path of a system that makes use of a light source of an embodiment of the present invention. As shown in FIG. 3, in a light source of a specific wavelength, when the monitored value of the output optical power rises to a threshold value and an anomaly is detected, an output optical power 51 of the LD module of the light source for which the anomaly was detected is, after an anomaly state diagnosis period, gradually reduced using the time constant which is greater than or equal to the sum of the EDF excitation emission time constant and the automatic gain control circuit tracking time constant, and the output of light is suspended.

Hence, after the anomaly state diagnosis period, an input optical power 52 to the EDF optical amplifier gradually drops by an amount exactly corresponding to the output optical power of the light source in which the anomaly has occurred. An output optical power 53 from the EDF optical amplifier also drops gradually after the anomaly state diagnosis by an amount exactly corresponding to the output optical power of the light source in which the anomaly has occurred. During this period, an output optical power 54, which is the optical output power of the EDF optical amplifier excluding the output power of the light source for which the anomaly occurred, remains constant.

According to the above-described embodiment, when an anomaly is detected in the monitored value of the monitor-use output optical power, it is possible, by checking the monitored value of the main output optical power, to judge whether the operating state of the LD 31 is actually abnormal or the LD 31 is operating normally and the anomaly has occurred in the monitoring system. When, it is judged that the LD 31 is normal but the monitoring system is abnormal, the optical output power of the LD 31 can be gradually attenuated. Consequently, it is possible to prevent excitation light from being left over in the EDF as a result of the extinguishing or immediate suspension of the output light from the LD 31.

Hence, it is possible to prevent a temporary change in the output optical power from other light sources which contribute to the optical output power from the optical amplifier. Further, when the monitored value for the main output optical power is abnormal and the monitored value for the power of the monitor-use output light is normal, it is possible to judge that the LD 31 is normal and the monitoring system is abnormal, and the optical output of the LD 31 can therefore be gradually attenuated. Note that a monitoring function for monitoring the main output optical power may be provided separately from the LN modulator 24 and the LN control block 25.

Figure 4:
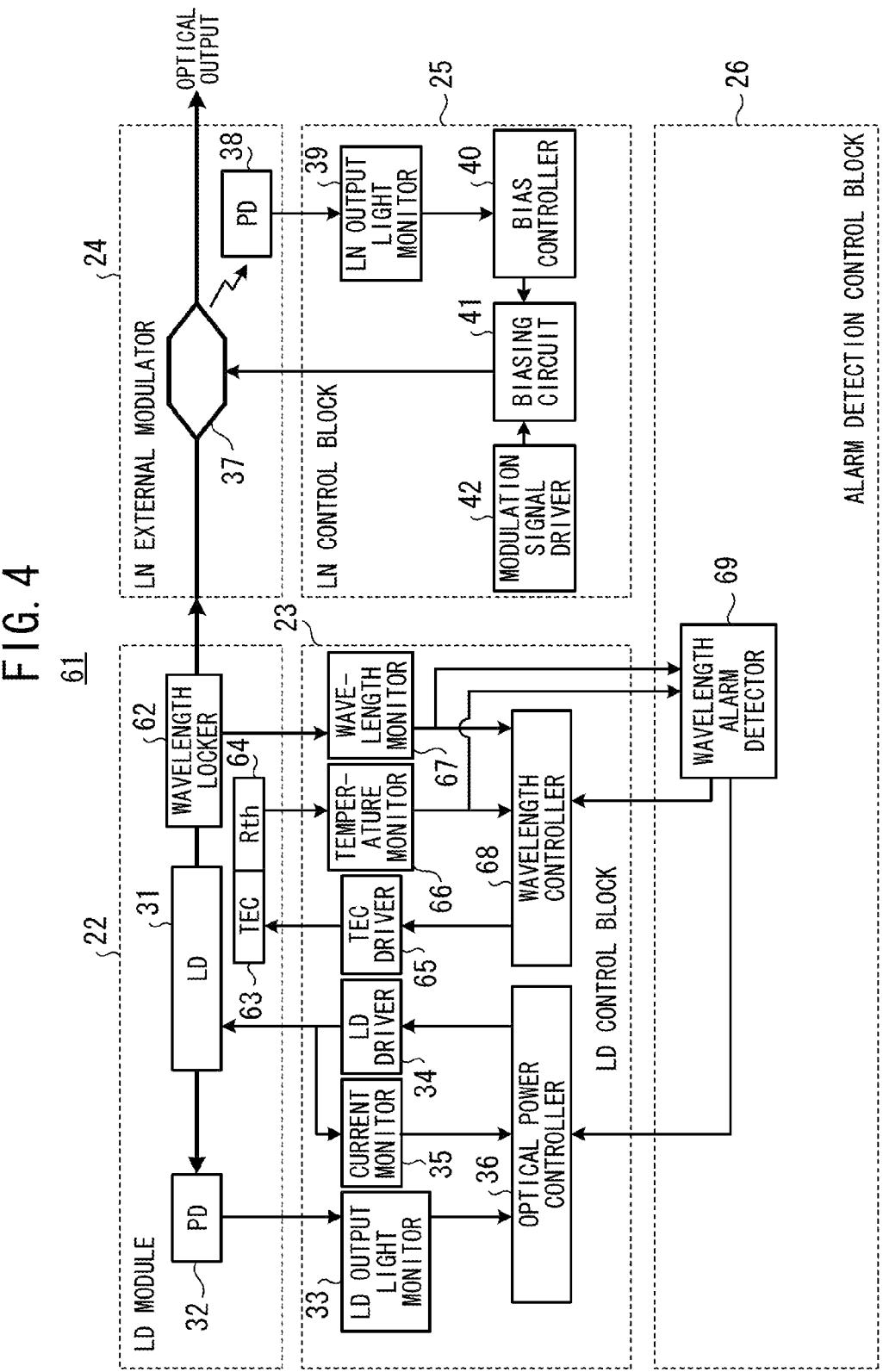
FIG. 4 is a block diagram illustrating a configuration of a light source according to an embodiment.

FIG. 4 is a block diagram showing a configuration of a light source according to an embodiment of the present invention. As shown in FIG. 4, a light source 61 includes, in addition to the light source configuration of FIG. 1, a wavelength locker 62 having a wavelength-dependent permittivity constituted by a filter or the like, a thermoelectric cooler (TEC) 63 which may be a Peltier device or the like, and a temperature sensor 64 which is a thermistor (Rth) or the like in the LD module 22. Further, the LD control block 23 includes a thermoelectric cooler driver (TEC driver) 65, a temperature monitor 66, a wavelength monitor 67 and a wavelength controller 68. The alarm detection control block 26 includes a wavelength alarm detector 69 in place of the optical output alarm detector 43 shown in FIG. 1

The wavelength monitor 67 monitors a wavelength of the output light from the LD 31 based on an output signal from the wavelength locker 62. Hence, the wavelength locker 62 and the wavelength monitor 67 may be considered as functioning as a first monitoring unit. The temperature monitor 66 monitors a temperature of the thermoelectric cooler 63 based on an output signal from the temperature sensor 64. Since the LD 31 is provided in relation to the thermoelectric cooler 63, the temperature of the thermoelectric cooler 63 is equal to the temperature of the LD 31. Hence, the temperature sensor 64 and the temperature monitor 66 may be considered as functioning as the second monitoring unit.

The wavelength controller 68 outputs the control signal based on the output signal from the temperature monitor 66 and the output signal from the wavelength monitor 67. The thermoelectric cooler driver 65 outputs a driving signal for thermoelectric cooler 63 based on the control signal. In the normal steady-state operating state, automatic frequency control (AFC) is performed by the wavelength locker 62, the wavelength monitor 67, the temperature sensor 64, the temperature monitor 66, the wavelength controller 68, the thermoelectric cooler driver 65 and the thermoelectric cooler 63.

The wavelength alarm detector 69 detects an anomaly in the light source 61 based on an output signal from the wavelength monitor 67 and an output signal from the temperature monitor 66. The wavelength alarm detector 69 judges, based on content of the detected anomaly, whether to instantaneously attenuate the optical output of the LD 31 or gradually attenuate the optical output of the LD 31. Hence, the wavelength alarm detector 69 functions as the detection unit. The wavelength alarm detector 69 outputs a control signal to the optical power controller 36 based on a result of the judgment.

Based on the output signal from the wavelength alarm detector 69, the optical power controller 36 either instantaneously attenuates the optical output of the LD 31 or gradually attenuates the optical output of the LD 31 using a time constant which is at least the sum of the EDF excitation emission time constant and the automatic gain control circuit tracking time constant. Note that since an optical output alarm detector is not provided in this embodiment, anomaly detection in the light source 61 based on the output signal of the LD output light monitor 33 and the output signal of the modulator output monitor 39 described in FIG. 1 is not required to be performed.

In an embodiment shown in FIG. 4, automatic power control (APC) is performed by the PD 32, the LD output light monitor 33, the optical power controller 36, and the LD driver 34, and automatic biasing control (ABC) is performed by the PD 38, the modulator output monitor 39, the bias controller 40, and the biasing circuit 41. Other portions of the configuration are the same as the embodiment shown in FIG. 1.

Figure 5:
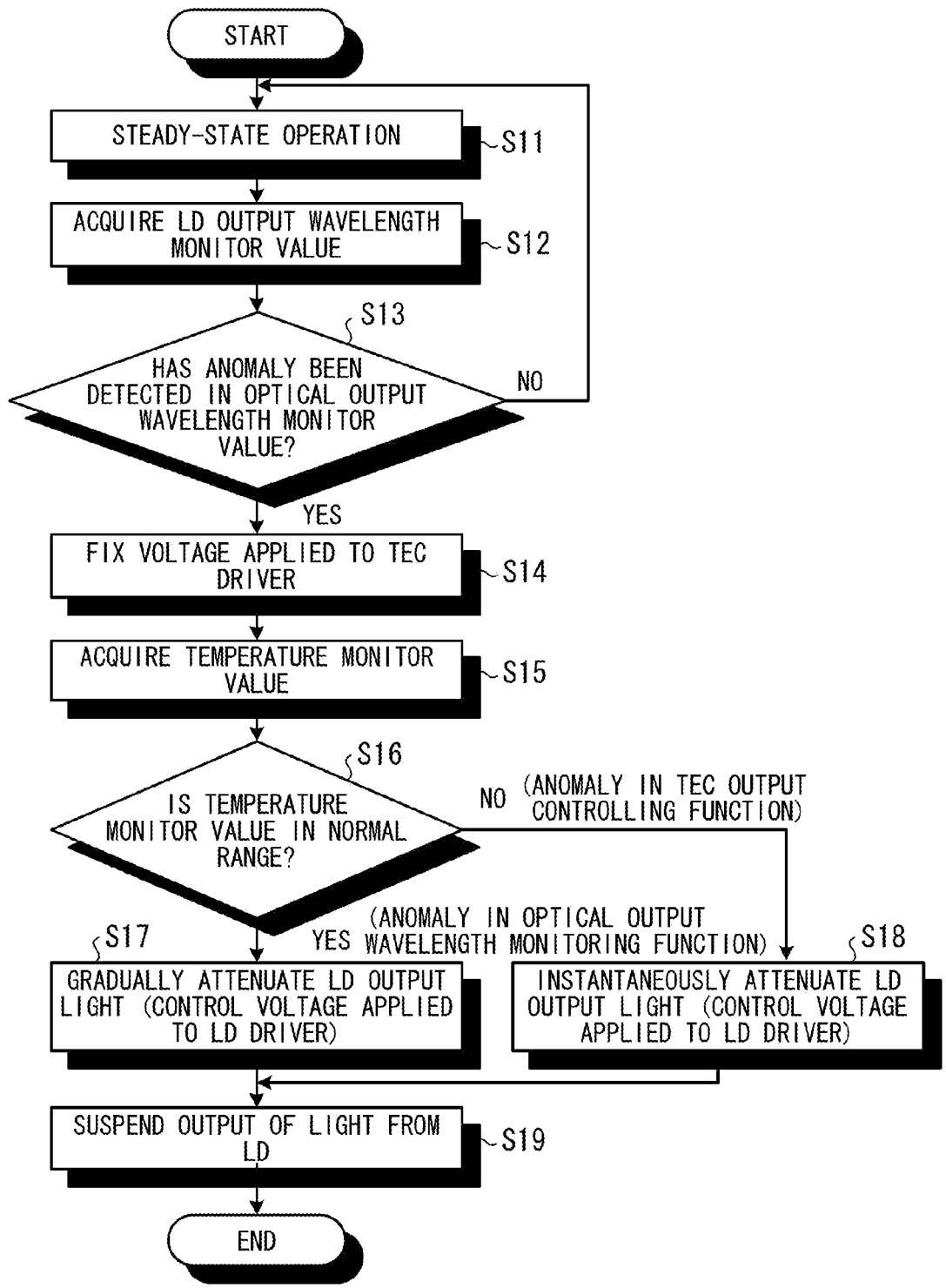
FIG. 5 is a flowchart illustrating an optical output suspending processing procedure used upon detection of an anomaly in a light source according to an embodiment.

FIG. 5 is a flowchart showing an optical output suspending processing procedure used upon detection of an anomaly in the light source according to the embodiment shown in FIG. 4. As shown in FIG. 5, in a normal steady-state operating state, the above-described automatic frequency control (AFC) is performed, and the wavelength of the output light from the LD 31 is stable (operation S11). In this state, the wavelength alarm detector 69 acquires a value (LD output wavelength monitor value) from the wavelength monitor 67 (operation S12), and judges whether an anomaly in the monitored value for the optical output wavelength has been detected (operation S13). When no anomaly is detected in the monitored value of the optical output wavelength (No in operation S13), the processing returns to operation S11.

When an anomaly in the monitored value for the optical output wavelength has been detected (Yes in operation S13), the wavelength alarm detector 69 fixes a voltage applied to the thermoelectric cooler (TEC) driver 65 by the wavelength controller 68 at a value immediately before detection of the anomaly (operation S14). As a result, the feedback control (AFC) of the output optical wavelength is suspended. Next, the wavelength alarm detector 69 acquires and checks a value (temperature monitor value) from the temperature monitor 66 (operation S15). Next, the wavelength alarm detector 69 judges whether the value from temperature monitor 66 is in a normal range (operation S16).

When the value is in the normal range (Yes in operation S16), the wavelength alarm detector 69 judges that the anomaly is in the optical output wavelength monitoring function. In this case, it is inferred that the LD 31 is in a state in which control by the optical power controller 36 and the LD driver 34 is possible. Hence, the wavelength alarm detector 69 controls the voltage applied to the LD driver 34 by optical power controller 36, so that the output light of LD 31 is gradually attenuated using a time constant which is at least the sum of the EDF excitation emission time constant and the automatic gain control circuit tracking time constant (operation S17). As a result, it is possible to suspend the output of light from the LD 31 through gradual attenuation (operation S19).

On the other hand, when the value from the temperature monitor 66 is outside the normal range (No in operation S16), the wavelength alarm detector 69 judges that the optical output wavelength monitoring function is normal and the anomaly is in the optical output wavelength. In other words, the wavelength alarm detector 69 judges that the thermoelectric cooler (TEC) output control function is abnormal. In this case, the wavelength alarm detector 69 controls the voltage applied by the optical power controller 36 to the LD driver 34 so that the output light from the LD 31 is attenuated instantaneously (operation S18). As a result, it is possible to suspend the output of light from the LD 31 instantaneously (operation S19).

Figure 6:
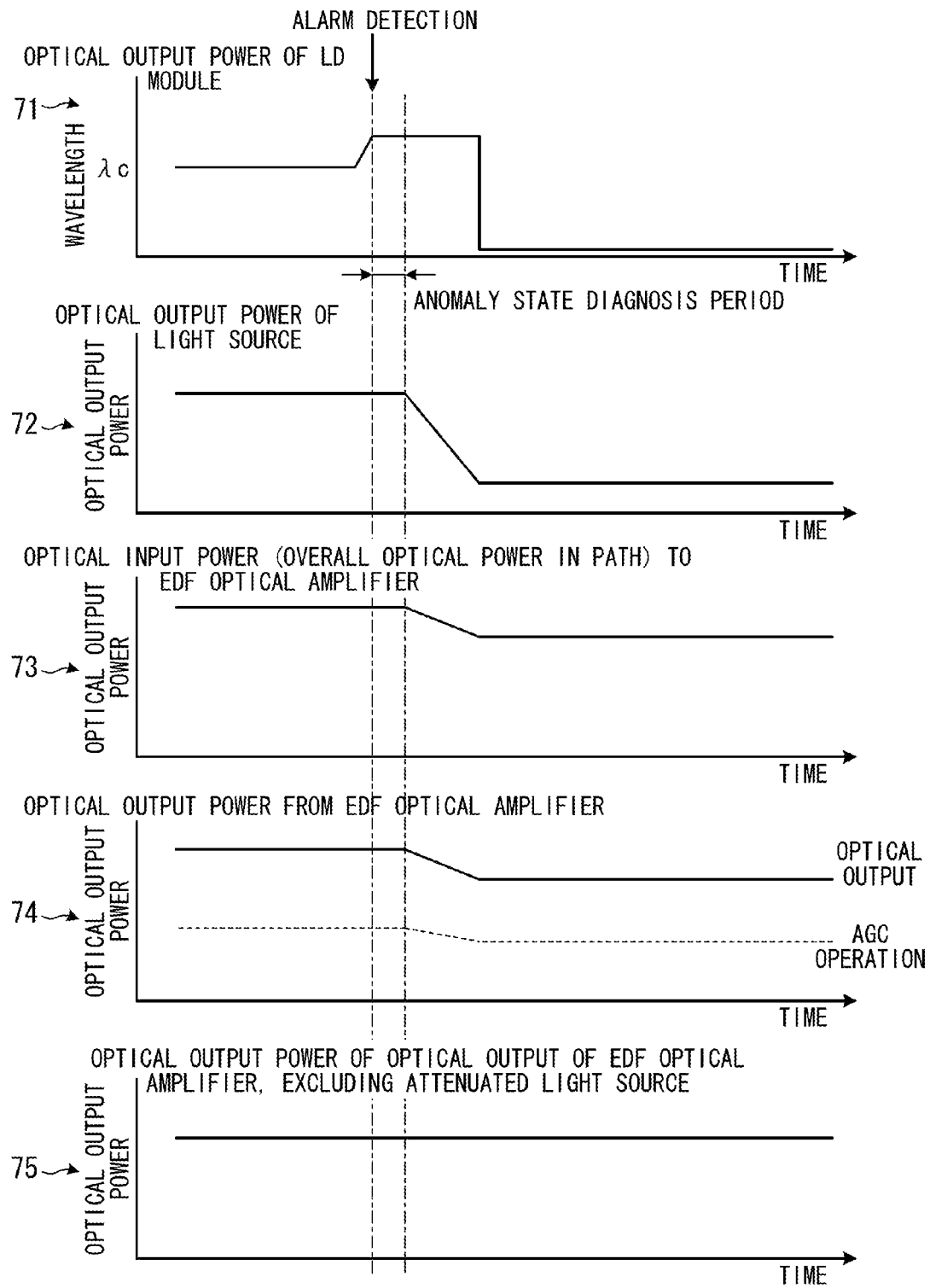
FIG. 6 is a set of schematic plots illustrating optical change(s) in a transmission path of a system using a light source according to an embodiment.

FIG. 6 is a set of schematic plots illustrating optical changes in the transmission path of the system using the light source according to the embodiment shown in FIG. 4. As shown in FIG. 6, in a light source of a specific wavelength, when the monitored value of the output optical wavelengths rises to a threshold and an anomaly is detected, an output optical power 72 of the light source in which the anomaly has been detected is, after an anomaly state diagnosis period, gradually reduced using a time constant which is greater than or equal to the sum of the EDF excitation emission time constant and the automatic gain control circuit tracking time constant, and the output of light is suspended.

Hence, after the anomaly state diagnosis period, an input optical power 73 to the EDF optical amplifier is gradually reduced by an amount of optical output power exactly corresponding to the output optical power of the light source in which the anomaly has occurred. After the anomaly state diagnosis period, an output optical power 74 from the EDF optical amplifier also drops gradually by an amount exactly corresponding to the output optical power of the light source in which the anomaly has occurred. During this period, an optical power 75, which is the output optical power in the EDF optical amplifier from light sources other than the light source in which the anomaly has occurred, remains constant.

Note that the uppermost characteristic plot in FIG. 6 is a plot showing an optical output wavelength 71 of the LD module of the light source in which the anomaly has been detected, and $\lambda c$ is the target wavelength. As shown in the characteristic plot of the optical output wavelength 71, after the anomaly state diagnosis period, the wavelength remains high until the output light from the light source in which the anomaly has been detected is suspended. After the suspension of the output of light from the light source in which the anomaly has been detected, detection of the wavelength ceases. This state in which the wavelength is not detected is shown as a low level near to the horizontal axis in the characteristic plot of the optical output wavelength 71 in FIG. 6.

According to the embodiment shown in FIG. 4, when an anomaly is detected in the monitored value for optical output wavelength, it is possible to judge, by checking the monitored value for the temperature of the thermoelectric cooler 63, whether the operating state of the LD 31 is actually abnormal or the LD 31 is operating normally and the anomaly has occurred in the monitoring system. When the monitored value for the temperature of the thermoelectric cooler 63 is anomalous and the monitored value of the optical output wavelength is normal, it is judged that the LD 31 is normal and the monitoring system is abnormal. Hence, the similar effects to the embodiment shown in FIG. 1 are obtained.

Figure 7:
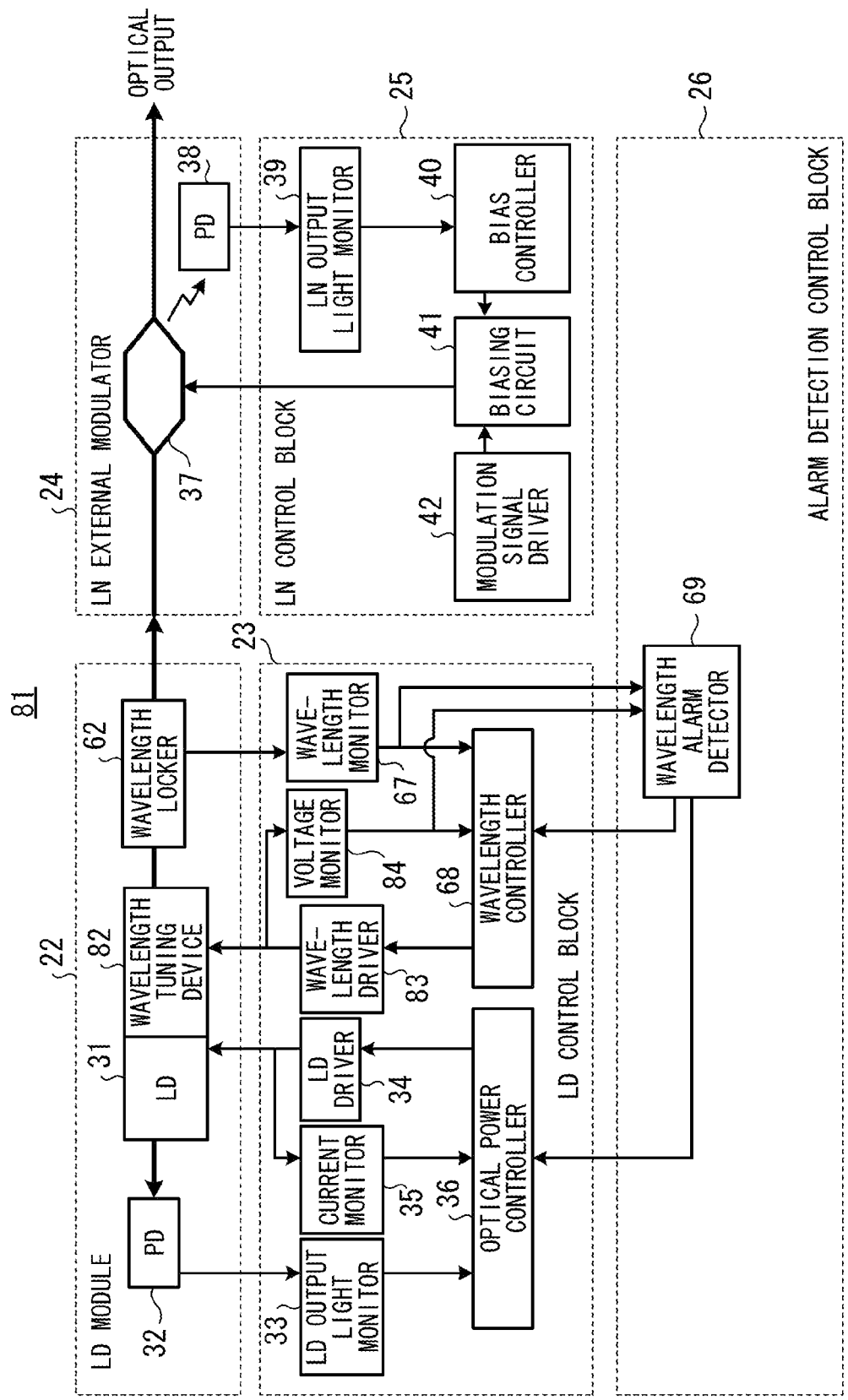
FIG. 7 is a block diagram illustrating a configuration of a light source according to an embodiment.

FIG. 7 is a block diagram showing a configuration of a light source according to an embodiment of the present invention. A light source 81 shown in FIG. 7 includes, in addition to the light source configuration of the embodiment shown in FIG. 4, a wavelength tuning device 82 enabled to control the output wavelength of the LD 31 based on an applied voltage in the LD module 22. Further, a wavelength driver 83 and a voltage monitor 84 are provided in the LD control block 23, the thermoelectric cooler, the temperature sensor, and the thermoelectric cooler driver are omitted.

The wavelength locker 62 and the wavelength monitor 67 in FIG. 7 may be considered as functioning as the first monitoring unit. The wavelength driver 83 outputs a voltage which is applied to the wavelength tuning device 82. The voltage monitor 84 monitors the output voltage from the wavelength driver 83, which is the voltage applied to the wavelength tuning device 82. Since the output wavelength of the LD 31 is controlled based on the applied voltage, the voltage monitor 84 functions as the second monitoring unit.

The wavelength controller 68 outputs the control signal based on the output signal of the voltage monitor 84 and the output signal of the wavelength monitor 67. Based on the control signal, the wavelength driver 83 outputs the voltage which is applied to the wavelength tuning device 82. In the normal steady-state operating state, automatic frequency control (AFC) is performed by the wavelength locker 62, the wavelength monitor 67, the voltage monitor 84, the wavelength controller 68, the wavelength driver 83 and the wavelength tuning device 82. The wavelength alarm detector 69 detects an anomaly in the light source 81 based on the output signal of the wavelength monitor 67 and the output signal of the voltage monitor 84. Other elements of the configuration are the same as in the above-discussed embodiment.

Figure 8:
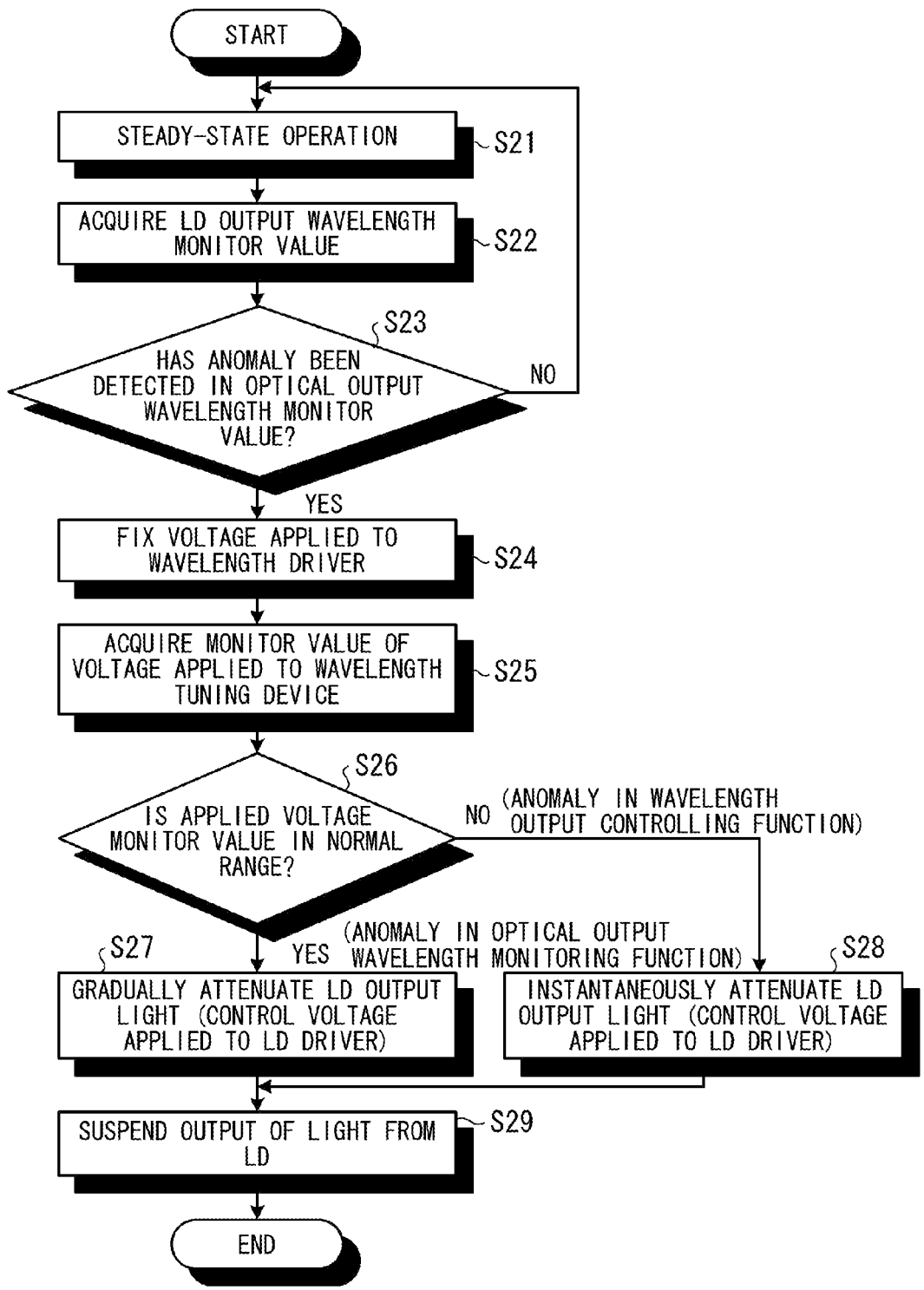
FIG. 8 is a flowchart illustrating an optical output suspending processing procedure used upon detection of an anomaly in a light source according to an embodiment.
Figure 9:
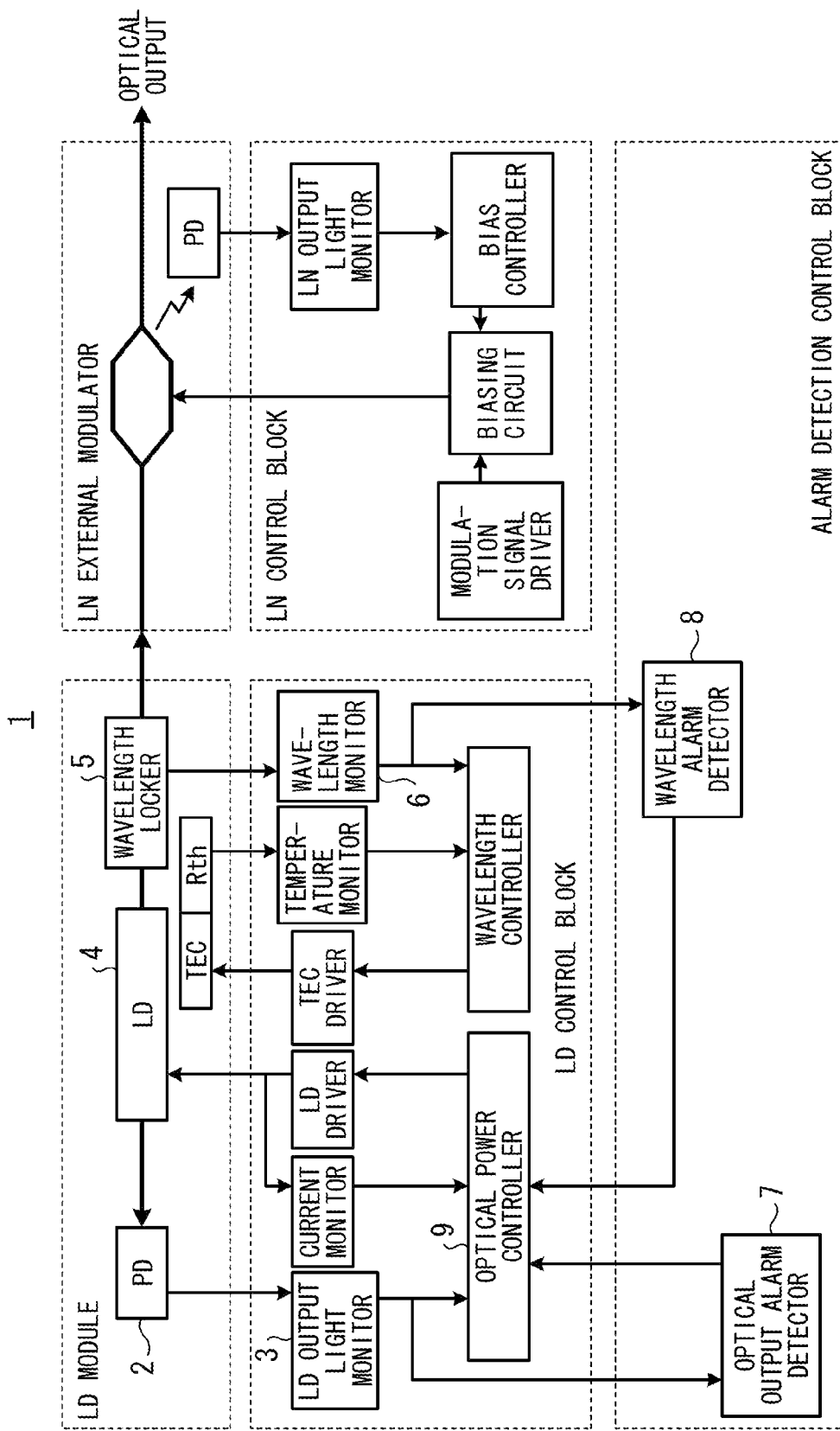
FIG. 9 is a block diagram illustrating a configuration of a light source in a related art.
Figure 10:
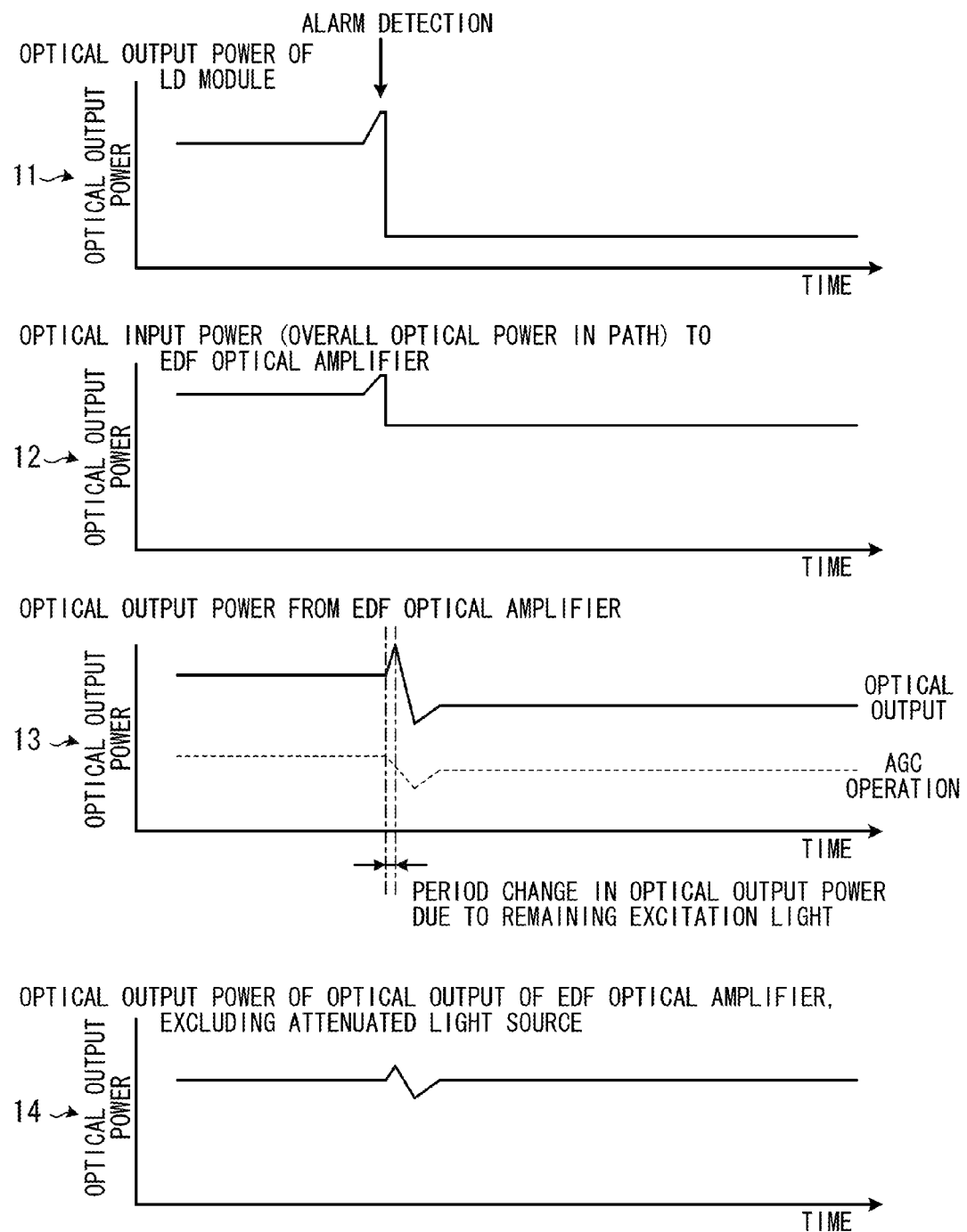
FIG. 10 is a set of schematic plots illustrating optical changes in the transmission path of the system of a related art.

FIG. 8 is a flowchart showing an optical output suspending processing procedure used upon detection of an anomaly in the light source according to the embodiment shown in FIG. 7. As shown in FIG. 8, in the normal steady-state operating state, the above-described automatic frequency control (AFC) is performed, and the wavelength of output light from the LD 31 is stable (operation S21). In this state, the wavelength alarm detector 69 acquires a value (LD output wavelength monitor value) from the wavelength monitor 67 (operation S22), and judges whether an anomaly in the monitored value of the optical output wavelength has been detected (operation S23). When no anomaly is detected in the monitored value of the optical output wavelength (No in operation S23), the processing returns to operation S21.

When an anomaly in the monitored value of the optical output wavelength has been detected (Yes in operation S23), the wavelength alarm detector 69 fixes a voltage applied by the wavelength controller 68 to the wavelength driver 83 at a value immediately before detection of the anomaly (operation S24). As a result, the feedback control (AFC) of the optical output wavelength is suspended. Next, the wavelength alarm detector 69 acquires and checks a value from the voltage monitor 84, which is the value of the voltage applied to the wavelength tuning device 82 (operation S25). Next, the wavelength alarm detector 69 judges whether the value from voltage monitor 84 is in a normal range (operation S26).

When the value is in the normal range (Yes in operation S26), the wavelength alarm detector 69 judges that the anomaly is in the optical output wavelength monitoring function. In this case, it is inferred that the LD 31 is in a state in which control by the optical power controller 36 and the LD driver 34 is possible. Hence, the wavelength alarm detector 69 controls the voltage applied to the LD driver 34 by the optical power controller 36, so that the output light of LD 31 is gradually attenuated using the time constant which is at least the sum of the EDF excitation emission time constant and the automatic gain control circuit tracking time constant (operation S27). As a result, it is possible to suspend the output of light from the LD 31 through gradual attenuation (operation S29).

On the other hand, when the value from the voltage monitor 84 is outside the normal range (No in operation S26), the wavelength alarm detector 69 judges that the optical output wavelength monitoring function is normal and the anomaly is in the optical output wavelength. In other words, the wavelength alarm detector 69 judges that the wavelength output control function by the wavelength tuning device 82 is abnormal. In this case, the wavelength alarm detector 69 controls the voltage applied by the optical power controller 36 to the LD driver 34 so that the output light from the LD driver 34 is instantaneously attenuated (operation S28). As a result, it is possible to suspend the output of light from the LD 31 instantaneously (operation S29). The optical changes in the transmission path of the system which makes use of the light source of the embodiment shown in FIG. 7 are the same as the optical changes shown in FIG. 6 for the embodiment shown in FIG. 4.

According to the embodiment shown in FIG. 7, when an anomaly is detected in the monitored value for the optical output wavelength, it is possible to judge, by checking the voltage applied to the wavelength tuning device 82 using the voltage monitor 84, whether the operating state of the LD 31 is actually abnormal or the LD 31 is operating normally and the anomaly has occurred in the monitoring system. Further, when the monitored value from the voltage monitor 84 is abnormal and the monitored value for the optical output wavelength is normal, it is possible to judge that the LD 31 is normal and the monitoring system is abnormal. Hence, the similar effects to the embodiment shown in FIG. 1 are obtained.

As described above, when an anomaly is detected in a monitored value, the light source of the embodiments of the present invention controls the optical output from the LD in accordance with a state of the anomaly, and allows suppression of a level change(s) in the output optical power of the optical amplifier caused by shutting down of the optical output as a result of the detection of the anomaly in the monitored value.

Since the light source according to the embodiments of the present invention monitors an operating state of the LD using two different systems, when an anomaly is detected in the monitored value, it is possible to judge whether the operating state of the LD 31 is actually abnormal or the LD 31 is operating normally and the anomaly has occurred in the monitoring system. Thus, depending on the judgment, it is possible to instantaneously attenuate or gradually attenuate the optical output of the LD. In the case that the attenuation of the optical output from the LD is gradual, the attenuation is performed using an optical output attenuation time constant that is greater than or equal to the tracking time constant of the optical amplifier, and it is therefore possible to prevent excitation light from being left over in the EDF as a result of the extinguishing of output light from the LD. Hence, it is possible to prevent a temporary change in the output optical power from other light sources which contribute to the optical output power from the optical amplifier.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An optical apparatus, comprising:
   a light source;
   a monitoring unit monitoring a plurality of characteristics of the light source; and
   a control unit controlling the light source based on the plurality of characteristics monitored; and
   wherein the control unit controls the light source of a first case when only one of the characteristics monitored is abnormal differently than for a second case when more than one of the characteristics monitored are abnormal in accordance with content of anomaly detected as a result of the monitoring.

2. The optical apparatus according to claim 1, wherein the control unit decreases an output power of the light source with a different time constant for the first case than that of the second case.

3. The apparatus according to claim 2, wherein the control unit decreases the output power of the light source instantly for the first case and decreases the output power of the light source gradually for the second case.

4. The optical apparatus according to claim 1, wherein the monitoring unit monitors an output power of a front output light of the light source and an output power of a rear output light of the light source.

5. The optical apparatus according to claim 1, comprising:
an optical modulator modulating an output light of the light source, wherein the monitoring unit monitors an output power of the output light of the light source and an output power of an output light of the optical modulator.

6. A light source according to claim 1, wherein the monitoring unit includes a current monitor for monitoring a current for an LD module of the light source.

7. A light source according to claim 1, wherein the monitoring unit includes a wavelength monitor for monitoring a wavelength of an LD module of the light source.

8. A light source according to claim 1, wherein the monitoring unit includes a voltage monitor for monitoring a voltage for tuning a wavelength of an LD module of the light source.

9. A light source according to claim 1, wherein the monitoring unit includes a current monitor, a wavelength monitor, and a voltage monitor.

10. A control method of a light source, comprising:
monitoring a plurality of characteristics of the light source;
controlling the light source based on the plurality of characteristics monitored, wherein a controlling sequence applied to the light source is different for a first case when only one of the characteristics monitored is abnormal than for a second case when more than one of the characteristics monitored are abnormal in accordance with content of anomaly detected as a result of the monitoring.

11. The method according to claim 10, wherein the control sequence decreasing an output power of the light source with different time constant for the first case and the second case.

12. A light source monitored by a monitoring unit and controlled by a control unit based on a plurality of monitored results by the monitoring unit; wherein
the control unit controls the light source differently for a first case when only one of characteristics of the light source monitored is abnormal than that for a second case when more than one of the characteristics monitored are abnormal in accordance with content of anomaly detected as a result of the monitored results.

13. A light source according to claim 12, wherein the control unit decreases an output power of the light source with a different time constant for the first case than that of the second case.

* * * * *